UNITED STATES PATENT OFFICE.

HARRY PAULING, OF GELSENKIRCHEN, GERMANY, ASSIGNOR TO SALPETERSÄURE-INDUSTRIE-GESELLSCHAFT, G. M. B. H., OF GELSENKIRCHEN, GERMANY.

METHOD OF CONCENTRATING NITRIC ACID.

1,031,864.      Specification of Letters Patent.      Patented July 9, 1912.

No Drawing.      Application filed September 27, 1910. Serial No. 584,123.

*To all whom it may concern:*

Be it known that I, HARRY PAULING, manager, subject of the King of Saxony, residing at 84 Wilhelmstrasse, Gelsenkirchen, IV, in the Kingdom of Prussia, German Empire, have invented a new and useful Improvement in Methods of Concentrating Aqueous Solutions of Nitric Acid; and I do hereby declare the following to be a full, clear, and exact description of the same.

This invention relates to processes of concentrating nitric acid; and it comprises passing aqueous nitric acid in mixture with sulfuric acid or other suitable dehydrating agent against a counterflowing current of steam, or of a mixture of a large proportion of steam inert toward nitric acid, the conditions of operation being such that highly concentrated vapors of nitric acid are obtained, while the water originally present in the aqueous nitric acid is substantially all taken up and retained by the dehydrating agent.

A known method of concentrating nitric acid consists in subjecting the acid to a kind of countercurrent treatment, for example by introducing the nitric acid and a drying agent, preferably sulfuric acid, into a vertical pipe, at the upper end, and heating the pipe from the outside. This necessitates apparatus of large dimensions, since, in order to avoid the formation of nitroso-sulfuric acid the temperature must not be raised too high. Nitroso-sulfuric acid, if formed, can only be decomposed by high dilution, and dilution is, of course, contrary to the purpose of the process. Moreover, the filling mass placed in the pipe cannot be so arranged as to secure perfectly uniform distribution of the mixture, so that local over-heating and decomposition of nitric acid occurs. Similar disadvantages attend the proposed method of passing the mixture downward through a column through which hot air or other gases are passed in an upward direction in order to supply heat for distilling off the nitric acid. The air must not be too hot, for the reason already mentioned, so that a large quantity of air, and large apparatus, are required. The nitric acid vapor is highly diluted with air (or other gas), and this dilution favors decomposition of the acid and considerably interferes with condensation of the vapors. The hot air or other gas carries away a certain proportion of acid, which is lost. The present invention obviates these disadvantages while securing certain new advantages and involves the use of steam, or a mixture of steam and gas, as the heat carrier flowing as a counter-current against a stream of nitric acid and sulfuric acid or other hygroscopic substance. During the passage of the steam the nitric acid is almost wholly separated from the mixture; the steam is gradually absorbed by the sulfuric acid, and converted into water, whereby its latent heat is liberated and utilized for evaporation of nitric acid. This process takes place along the whole common path of the streams, and by using a path of sufficient length nitric acid of the highest possible concentration is obtained, and practically all traces of nitric acid are removed from the sulfuric acid. The best results are obtained with mixtures free from impurities such as organic matter, nitrogen oxides and nitroso-sulfuric acid. Under the conditions of operation here contemplated, nitric acid of 96 to 98% strength is easily obtained from a mixture containing one part of 48% nitric acid to two parts of 94% sulfuric acid, the whole of the nitric acid being obtained at the strength stated.

The most simple method of carrying out the process comprises passing the mixture of acids through a vertical pipe or column from the top downward, and passing in dry steam at the bottom, the pipe being partly filled with a suitable "filling" mass. Preferably the steam is superheated, but this is not essential. Instead of pure steam, inert gases mixed with a large proportion of steam may be used. "Countercurrent" apparatus other than a vertical column may be used. The rate at which the hot gaseous medium is supplied to the base of the column should, of course, be so regulated that highly concentrated nitric acid vapors leave the outlet at the top of the column while the spent sulfuric acid leaving the base of the column retains substantially all the water originally present in the dilute nitric acid.

What I claim is:—

1. The process of concentrating aqueous nitric acid, which comprises passing aqueous nitric acid in admixture with a suitable dehydrating agent against a countercurrent of a hot gaseous medium composed largely of steam, and so regulating the conditions of operation that vapors of highly concentrated nitric acid are obtained, while the dehydrating agent takes up and retains substantially all the water of the aqueous nitric acid.

2. The process of concentrating aqueous nitric acid, which comprises passing aqueous nitric acid in admixture with a suitable dehydrating agent against a countercurrent of superheated steam, and so regulating the conditions of operation that vapors of highly concentrated nitric acid are obtained, while the dehydrating agent takes up and retains substantially all the water of the aqueous nitric acid.

3. The process of concentrating aqueous nitric acid, which comprises passing aqueous nitric acid in admixture with sulfuric acid against a countercurrent of steam and so regulating the conditions of operation that vapors of highly concentrated nitric acid are obtained, while the sulfuric acid takes up and retains substantially all the water of the aqueous nitric acid.

4. The process of concentrating aqueous nitric acid, which comprises passing aqueous nitric acid in admixture with sulfuric acid downwardly through a distilling column, introducing superheated steam at the base of the column, and withdrawing vapors of highly concentrated nitric acid from the upper part of the column.

5. The process of concentrating aqueous nitric acid, which comprises passing a mixture of aqueous nitric acid and strong sulfuric acid, substantially free of impurities such as nitroso-sulfuric acid and organic matter, against a countercurrent of steam, and obtaining vapors of highly concentrated nitric acid.

In testimony whereof, I have signed my name to this specification in the presence of two subscribing witnesses.

HARRY PAULING.

Witnesses:
 MATHILDE K. HELD,
 A. V. W. COTTER.